United States Patent [19]

Jargeaix

[11] Patent Number: 5,685,547
[45] Date of Patent: Nov. 11, 1997

[54] ENGINE GASKET WITH CRUSHABLE SPACER BOSSES

[75] Inventor: Gerard Jargeaix, Lyons, France

[73] Assignee: Curty Payen S.A., Saint Priest, France

[21] Appl. No.: 501,391

[22] Filed: Jul. 12, 1995

[30] Foreign Application Priority Data

Jul. 22, 1994 [FR] France .................. 94 09328

[51] Int. Cl.⁶ ................................ F16J 15/08
[52] U.S. Cl. ................ 277/9; 277/11; 277/235 B
[58] Field of Search ................ 277/9, 11, 234, 277/235 B

[56] References Cited

U.S. PATENT DOCUMENTS

| | | | |
|---|---|---|---|
| 1,864,854 | 6/1932 | Oven | 277/235 B |
| 3,353,666 | 11/1967 | Jensen . | |
| 4,466,617 | 8/1984 | Montgomery | 277/234 |
| 4,635,948 | 1/1987 | Zerfass et al. | 277/235 B |
| 4,828,275 | 5/1989 | Udagawa | 277/235 B |
| 5,118,121 | 6/1992 | Hellman, Sr. | 277/235 B |
| 5,211,408 | 5/1993 | Udagawa | 277/235 B |
| 5,427,389 | 6/1995 | Ishikawa et al. | 277/235 B |

FOREIGN PATENT DOCUMENTS

| | | |
|---|---|---|
| 2 176 450 | 10/1973 | France . |
| 2 303 209 | 3/1976 | France . |
| 1 142 477 | 7/1959 | Germany . |
| 39 27 341 | 10/1990 | Germany . |
| 41 16 822 | 11/1992 | Germany . |

*Primary Examiner*—Scott Cummings
*Attorney, Agent, or Firm*—Herbert Dubno Andrew Wilford

[57] ABSTRACT

An engine gasket is formed as a thin sheet of durable material having front and back faces and formed with an array of throughgoing holes and with surface formations projecting at most to a plane parallel to the front face. According to this invention the gasket is formed with fragile crushable spacer bosses projecting from the front face past the plane so that when a plurality of such gaskets are stacked the bosses will hold them substantially out of contact with each other except at the bosses.

8 Claims, 4 Drawing Sheets

ENGINE GASKET WITH CRUSHABLE SPACER BOSSES

FIELD OF THE INVENTION

The present invention relates to an engine gasket. More particularly this invention concerns a cylinder head or manifold gasket for an internal-combustion engine.

BACKGROUND OF THE INVENTION

A cylinder-head or manifold gasket is typically a thin heat-resistant and very durable sheet that is formed with various holes and apertures that are exactly positioned to fit with the ports, passages, and attachment bolts of the parts it will be clamped between. The sheet material from which the gasket is made is formed of a durable material, either a metal-fiber laminate or of a durable synthetic-resin or fiber-based composition. The gasket is a mass-production item that is supplied in multiples to the distributor or manufacturer.

It has been standard to stock and ship these gaskets in a simple stack, with the gaskets lying directly on one another in the stack in perfect registration. The problem with this is that with time the gaskets can adhere strongly together, in particular when the oil they pick up in manufacture dries out and effectively glues them together. This makes separating them without damage difficult, and occasionally leads to the end user mistakenly installing two sandwiched-together gaskets instead of the one that is needed. Obviously using more than one gasket creates fit problems and renders standard torquing procedures fairly meaningless.

U.S. Pat. No. 3,353,666 of Jensen suggests coating one face of the gasket with an contact adhesive and the opposite face with an adhesive resist, so that the gaskets can be stacked but still can be separated. With time they tend to stick together, and there remains the problem, in particular with very thin gaskets, of making sure that only one gasket is stripped from the stack.

In other systems, such as seen for example in French patent 2,176,450 of Nicholson, German 1,142,477 of Baumler, and German 3,927,341 of Quentin, the surfaces of the gasket are formed with or provided with upstanding bumps. Here however these bumps end in the same plane or level with the other normal surface formations of the gasket so that there is still ample area of the gasket that can stick to an adjacent gasket in a stack.

Thus it has been suggested to package the gaskets individually or, at least, provide a separation sheet between adjacent gaskets. While this is effective, it increases the cost of this otherwise inexpensive item and the packaging or separation sheet creates a disposal or recycling problem.

OBJECTS OF THE INVENTION

It is therefore an object of the present invention to provide an improved engine gasket.

Another object is the provision of such an improved engine gasket which overcomes the above-given disadvantages, that is which can be shipped in a stack without the use of separate packaging or a separation sheet, yet which will be easy to separate from the other gaskets in the stack.

SUMMARY OF THE INVENTION

An engine gasket is formed as a thin sheet of durable material having front and back faces and formed with an array of throughgoing holes and with surface formations projecting at most to a plane parallel to the front face. According to this invention the gasket is formed with fragile crushable spacer bosses projecting from the front face past the plane so that when a plurality of such gaskets are stacked the bosses will hold them substantially out of contact with each other except at the bosses.

Thus with this system these bosses, which do not affect the eventual sealing use of the gasket because they are offset from the critical sealing area, make it possible to ship and store the gaskets in stacks while still being able to separate them from one another easily. When stacked the bosses of each gasket hold it wholly out of contact with the back face of the underlying gasket, so that not only is there no chance of the two sticking together, but it would be impossible to mistake two gaskets for one.

The bosses can be unitarily formed with the gasket. When the sheet is provided on each of its faces with a metallic face layer the bosses are formed punched out of the sheet offset from the front-face layer to form respective recesses on the back face. The metallic face layer on the back face covers the recesses and the metallic face layer on the front face is formed with apertures through which the respective bosses pass. These bosses are offset longitudinally relative to one another relative to a longitudinal centerline of the gasket.

According to the invention it is also possible when at least the front face of the sheet is provided with a metallic face layer for the bosses to be formed unitarily with the metallic face layer. In another arrangement the sheet has an outer edge and is folded over at the outer edge to form the bosses. It is furthermore possible for the bosses to be formed as molded-on pieces of a synthetic resin.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
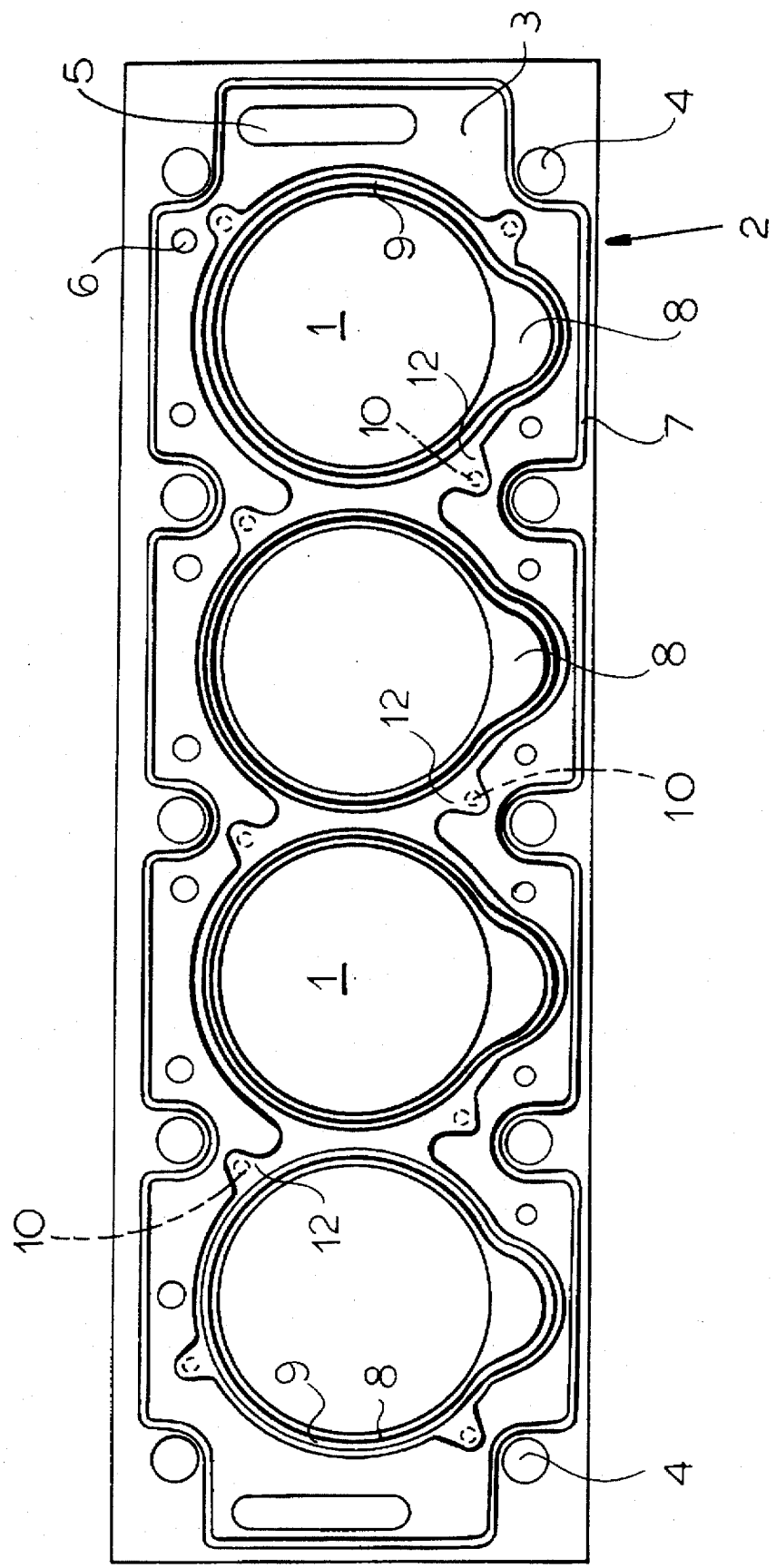
FIG. 1 is a small-scale top view of a cylinder-head gasket according to the invention.

As seen in FIG. 1 a cylinder-head 2 according to the invention is formed with a central core part 3 in which are formed holes 1 for the combustion cylinders, holes 4 for bolts that secure the cylinder head to the engine block, holes 5 for coolant water, and holes 6 for lubricant oil. The core part 3 is of durable sheet material and is provided with elastomeric peripheral sealing ridges 7 and with metallic plates or face layers 8 of steel forming ridges 9 surrounding the combustion-cylinder holes 1.

Figure 4:
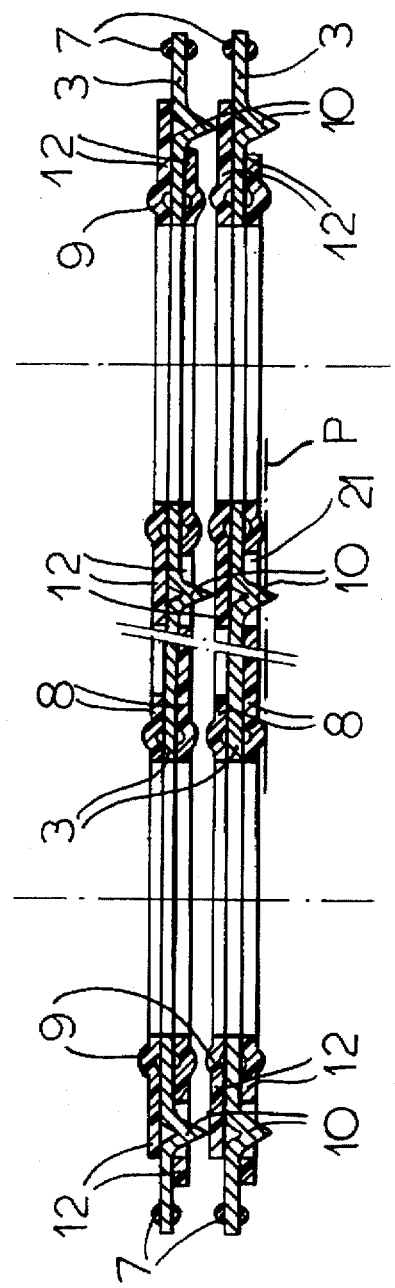
FIG. 4 is a section taken along line IV—IV of the gasket of FIG. 3.
Figure 3:
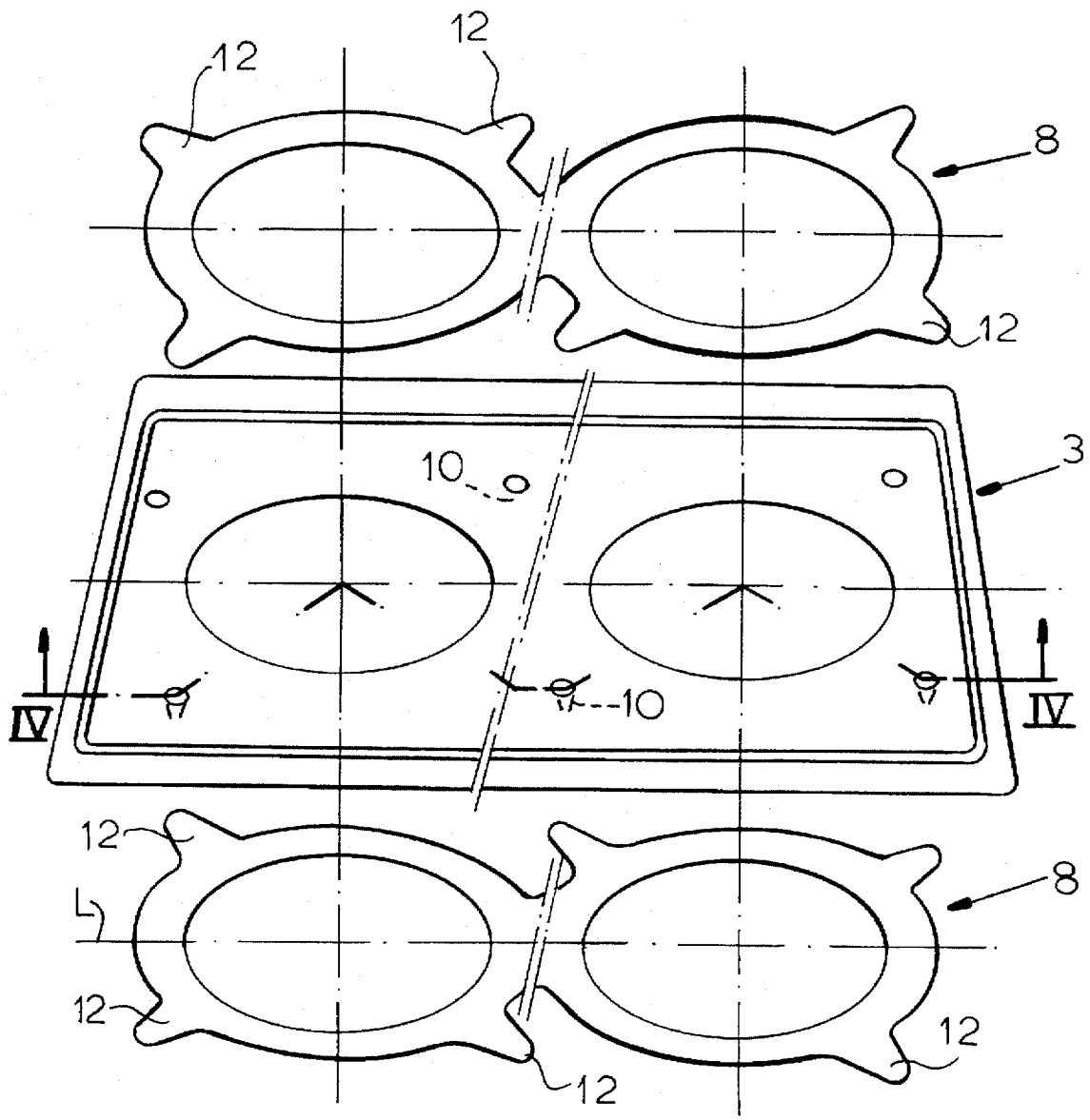
FIG. 3 is an exploded view of a gasket according to the invention.

According to the invention as shown in FIGS. 3 and 4 the gasket 3 is formed on its front face with bosses 10 acting as spacers and serving to hold the faces of adjacent such gaskets 3 apart when they are stacked together. The other surface formations 7 and 9 of the gasket 3 extend at most to a plane P parallel to the sheet 3 but the bosses 10 extend beyond this plane P as shown in FIG. 4. These spacer bosses 10 are constructed so that they are not associated with back-side recesses into which the spacer bosses 10 of an adjacent gasket 3 can nest, which would result in surface contact of the faces of adjacent gaskets and the above-described separation and sticking-together problem. This is accomplished in FIGS. 3 and 4 by forming the metallic plates 8 with tabs 12 that are offset relative to a centerline L from one side to the other of the centerline L, like the bosses 10, so that, even though the bosses 10 are punched out of the sheet material 3, the recesses formed on the back face of the sheet 3 where they are punched out are covered by the tabs 12. thus when the gaskets 3 are stacked together as shown in FIG. 4, the bosses 10 will hold them slightly apart, making separating them easy. The layers 8 on the front face are formed with apertures 21 through which the bosses 10 project.

Figure 5:
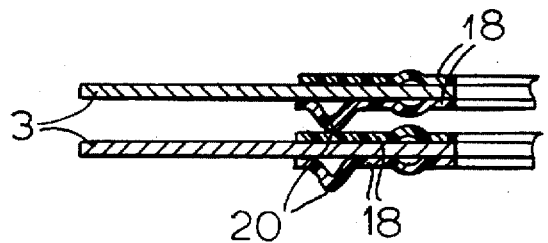
FIGS. 5, 6, 7, 8, 9, and 10 are sectional views of details of variants of the invention.

In FIG. 5 the bosses 20 are formed integrally with the metal 18 of the parts 8.

Figure 6:
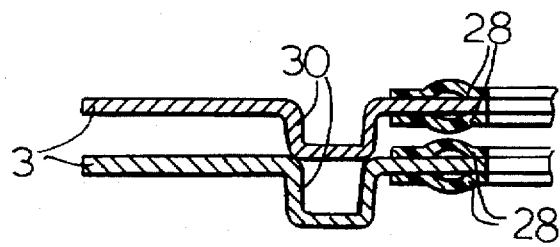

FIG. 6 shows how the sheet material 3 can be formed with bosses 30 that are of the same inside and outside dimensions. Thus even though a recess is formed on the back face, its inside dimension is too small to fit the outside dimension of the adjacent boss 30, so that the desired spacing effect is achieved.

Figure 2:
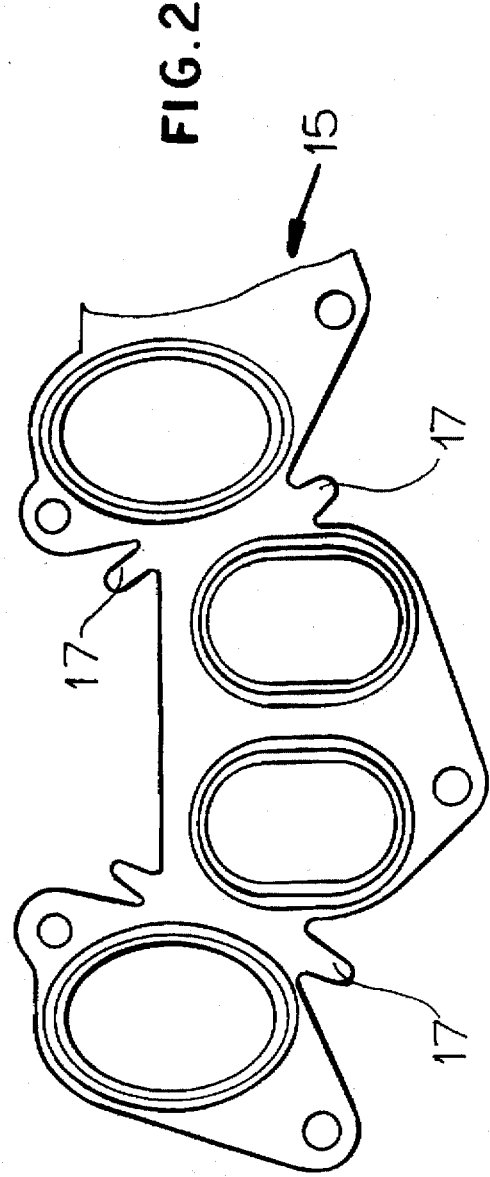
FIG. 2 is a top view of a portion of a manifold gasket according to the invention.
Figure 7:
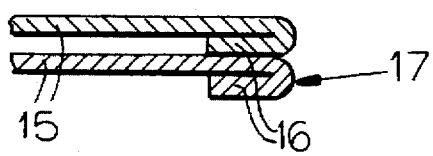
Figure 8:
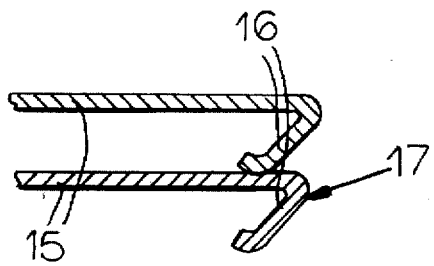

In FIGS. 2 and 7 the gasket sheet 15 has tabs 17 whose edges are folded over at 16 to form spacers. FIG. 8 shows how instead of the folded-over parts 16 being returned with no spacing, they are left extending at an acute angle to the plane of the sheet 15. These formations are at the very outer edge of the gasket and are in fact positioned so as not to be compressed between the parts between which the gasket is used.

Figure 9:
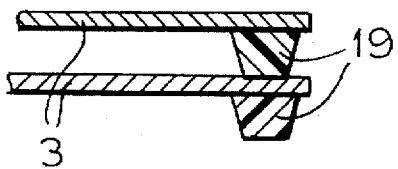
Figure 10:
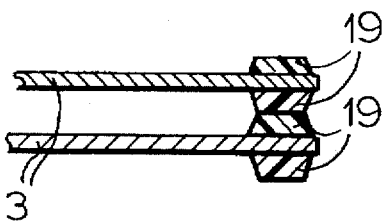

In FIG. 9 one face of the sheet 3 is provided with a synthetic-resin boss 19 and in FIG. 10 both faces have such bosses 19.

Figure 11:
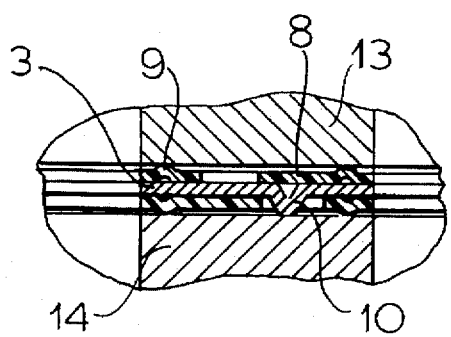
FIG. 11 is a view like FIG. 4 but showing the gasket according to this invention when installed.

In any case the bosses 10, 20, 30, 16, or 19 are relatively soft or fragile so that as shown in FIG. 11 for the gasket of FIGS. 1 and 4, when the respective gasket is flattened between parts 13 and 14 it is used with, the bosses are completely flattened out and, in effect, destroyed. They serve only as spacers during shipping and are of no effect when the gasket is eventually installed.

I claim:

1. In an engine gasket formed as a thin sheet of durable material having front and back faces and formed with an array of throughgoing holes and with surface formations projecting from the front face to a plane parallel to the front face, the improvement wherein the gasket is formed with fragile crushable spacer bosses projecting from the front face past the plane, whereby when a plurality of such gaskets are stacked the bosses will hold them substantially out of contact with each other except at the bosses, and the bosses are unitarily formed with the gasket.

2. The engine gasket defined in claim 3 wherein the bosses are unitarily formed with the gasket.

3. In an engine gasket formed as a thin sheet of durable material having front and back faces and formed with an array of throughgoing holes and with surface formations projecting from the front face to a plane parallel to the front face, the improvement wherein the gasket is formed with fragile crushable spacer bosses projecting from the front face past the plane, whereby when a plurality of such gaskets are stacked the bosses will hold them substantially out of contact with each other except at the bosses, the sheet is provided on each of its faces with a metallic face layer, and the bosses are formed punched out of the sheet offset from the front-face layer to form respective recesses on the back face, the metallic face layer on the back face covering the recesses and the metallic face layer on the front face being formed with apertures through which the respective bosses pass.

4. The engine gasket defined in claim 3 wherein the gasket has a longitudinal centerline and bosses to one side of the centerline are offset longitudinally relative to the bosses to the other side of the centerline.

5. The engine gasket defined in claim 1 wherein at least the front face of the sheet is provided with a metallic face layer and the bosses are formed unitarily with the metallic face layer.

6. The engine gasket defined in claim 1 the sheet has an outer edge and is folded over at the outer edge to form the bosses.

7. The engine gasket defined in claim 1 wherein the bosses are formed as molded-on pieces of a synthetic resin.

8. The engine gasket defined in claim 1 wherein the bosses are hollow.

\* \* \* \* \*